Aug. 5, 1924.   1,504,106
C. DORNIER
AIRCRAFT CONSTRUCTION
Filed Feb. 7, 1924
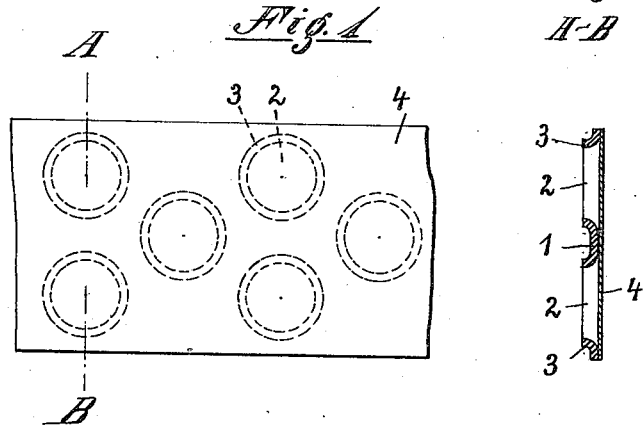
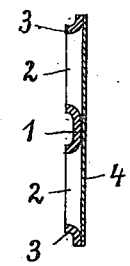
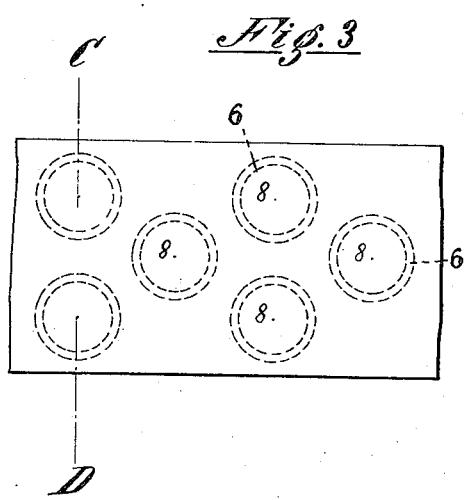
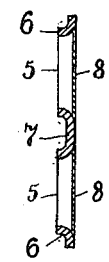
Inventor:
Claudius Dornier
by Michaelis
Attorney Patented Aug. 5, 1924.

1,504,106

UNITED STATES PATENT OFFICE.

CLAUDIUS DORNIER, OF FRIEDRICHSHAFEN-ON-THE-BODENSEE, GERMANY, ASSIGNOR OF ONE-HALF TO THE FIRM: DORNIER, METALLBAUTEN GESELLSCHAFT MIT BESCHRÄNKTER HAFTUNG, OF FRIEDRICHSHAFEN, GERMANY.

AIRCRAFT CONSTRUCTION.

Application filed February 7, 1924. Serial No. 691,193.

*To all whom it may concern:*

Be it known that I, CLAUDIUS DORNIER, a citizen of Germany, residing at Friedrichshafen-on-the-Bodensee, Germany, have invented certain new and useful Improvements in Aircraft Constructions, of which the following is a specification.

My invention has reference to the construction of aircraft and more especially to a material for use in the construction of all kinds of hollow bodies forming part of or to be connected with all-metal flying machines, for instance the fuselage, boat's hull, floats or the like made of sheet metal.

It is an object of my invention to provide a material for use in aircraft construction which combines the lightest possible weight with the greatest possible strength and capacity for transmitting compressive and tensile stresses and which is highly resistive against atmospheric influences.

In the construction of aeroplanes and the like, perforated metal sheet covered with light and thin material, such as fabric, paper, wood, cork or porous rubber have already been employed, however, all these materials do not answer the requirements of the all metal aircraft.

In contradistinction thereto, the material according to the present invention substantially consists of the combination of a comparatively thick metal sheet or strip presenting a number of perforations with beaded edges and a cover or covers of very thin sheet metal extending over and fixed to the perforated metal sheet and preferably to that surface thereof which is averted from the beaded edges. This thin metal skin may either be equal in length and width to and extend all over one surface of the thick sheet or strip or else over part of such surface, or small pieces may be fixed to the thick sheet or strip, preferably in the place where the perforations are located, these pieces of thin sheet metal then closing the perforations and being fixed to their edges. The thin skin can be fixed to the thick perforated sheet or strip by riveting or soldering or welding or by other suitable means and secures for the compound sheet or strip thus obtained a preferably smooth outer surface, provided that the compound sheet or strip be combined with other sheets or strips of the same or some other kind to form a hollow body in such a manner that the edges of the perforations are upturned in inward direction and the thin skin forms the outer surface.

In this compound material the thick sheet or strip mainly serves for taking up the compressive stresses, while the tensile stresses are taken up in the first line by the thin sheet or pieces of thin sheet metal.

In the drawings affixed to this specification and forming part thereof, two modifications of a piece of a compound strip embodying my invention are illustrated diagrammatically by way of example. In the drawings Fig. 1 is a plan view and Fig. 2 a cross section on the line A—B (Fig. 1) of the first modification, while Figs. 3 and 4 are similar views of a second modification.

Fig. 4 being a cross section on the line C—D in Fig. 3.

Referring to the drawings, 1 is the strip of comparatively thick sheet metal, and 2, 2 are perforations of comparatively large diameter, the edges 3 of which are beaded to project on one side of the metal. 4 is a strip of very thin metal fixed to the strip 1 on the side averted from the edges 3, this side being designed to be placed outwards when the compound strip is put to practical use in the construction of a hollow body.

The compound strip disclosed in Figs. 3 and 4 is distinguished from the one described above by each perforation 5 with upward edges 6 provided in the thick metal strip 7 being individually covered with a circular piece 8 of very thin sheet metal of slightly larger diameter than said perforation.

Obviously, light metal, such as duraluminium will be most suitable in making compound sheets or strips according to this invention, and hard or soft metal may be used in making the cover pieces or strips.

I wish it to be understood that I do not desire to be limited to the exact details of construction shown and described, for obvious modifications will occur to a person skilled in the art.

I claim:—

1. As a new article of manufacture, a compound material for use in the construction of hollow bodies for aviation purposes, comprising the combination of a comparatively thick metal sheet or strip with comparatively large perforations, the edges of which are turned up to project all above one surface of such sheet or strip, with a piece of very thin sheet metal fixed to the other surface of said thick sheet or strip and closing the perforations, one surface of the compound sheet or strip being perfectly smooth.

2. As a new article of manufacture, a compound material for use in the construction of hollow bodies for aviation purposes, comprising the combination of a comparatively thick metal sheet or strip with comparatively large perforations, the edges of which are turned up to project all above one surface of such sheet or strip, with pieces of very thin sheet metal fixed to the other surface of said thick sheet or strip, each piece being slightly larger in diameter than and closing one of said perforations, one surface of the compound sheet or strip being perfectly smooth.

In testimony whereof I affix my signature.

CLAUDIUS DORNIER.